United States Patent [19]
Buus

[11] 4,398,242
[45] Aug. 9, 1983

[54] ELECTRONIC CONTROLLER

[75] Inventor: Henning Buus, Woodinville, Wash.

[73] Assignee: The Boeing Company, Seattle, Wash.

[21] Appl. No.: 124,366

[22] Filed: Feb. 25, 1980

[51] Int. Cl.³ .......................... G05B 9/03; G05D 1/00
[52] U.S. Cl. .................................. 364/183; 91/363 A; 244/194; 244/223; 318/564; 318/628; 364/185; 364/434
[58] Field of Search ............... 364/118, 119, 432, 433, 364/434, 424, 183–187; 371/7; 318/564, 565, 566, 584, 8, 628; 244/178, 17.13, 181, 194, 76 R, 78, 183, 223, 226, 227, 229; 91/363 R, 363 A, 509, 434

[56] References Cited

U.S. PATENT DOCUMENTS

| | | | |
|---|---|---|---|
| 2,544,286 | 3/1951 | Tanner | 318/628 X |
| 2,953,325 | 9/1960 | Hadekel | 244/76 |
| 3,054,039 | 9/1962 | Meredith | 318/564 |
| 3,070,071 | 12/1962 | Cooper | 91/363 A |
| 3,120,787 | 2/1964 | Schmitt | 244/194 |
| 3,279,323 | 10/1966 | Asche | 91/363 A |
| 3,377,924 | 4/1968 | Spencer et al. | 91/363 A |
| 3,401,904 | 9/1968 | Nelson | 91/363 A |
| 3,411,410 | 11/1968 | Westbury et al. | 91/363 A |
| 3,422,327 | 1/1969 | McBrayer et al. | 318/564 X |
| 3,489,379 | 1/1970 | Bogart | 244/229 |
| 3,618,470 | 11/1971 | Mueller et al. | 91/363 A |
| 3,626,809 | 12/1971 | Pieper | 91/363 R |
| 3,700,995 | 10/1972 | Parkinson et al. | 318/628 |
| 3,724,330 | 4/1973 | Mason | 91/363 A |
| 3,733,039 | 5/1973 | O'Connor et al. | 244/181 |
| 4,035,705 | 7/1977 | Miller | 318/564 |
| 4,035,707 | 7/1977 | Debrie et al. | 318/628 |
| 4,079,906 | 3/1978 | Durandeau et al. | 244/194 |
| 4,094,481 | 6/1978 | Dewalt | 318/564 X |
| 4,095,763 | 6/1978 | Builta | 91/363 A X |
| 4,209,734 | 6/1980 | Osder | 318/564 |

Primary Examiner—Joseph F. Ruggiero
Attorney, Agent, or Firm—James P. Hamley; Bernard A. Donahue

[57] ABSTRACT

A pair of input sense signals are processed and passed to inputs of two servo amplifiers. The amplifier outputs are summed and converted to a corresponding hydraulic pressure in a T-valve. Transducers monitor the produced pressure and provide feedback signals to the servo amplifiers. A comparator compares the servo amplifier outputs and activates a warning device if the signal difference therebetween exceeds a threshold level. Equalizer circuitry processes the comparator output and provides correction signals to the servo amplifier inputs to wash-out offset effects.

11 Claims, 3 Drawing Figures

ELECTRONIC CONTROLLER

BACKGROUND OF THE INVENTION

The present invention pertains to the electronic control art and, more particularly, to improved fault detection and equalizing apparatus for the same.

Electronic controllers are well known in the prior art. In a typical application, a controller responds to two or more parameter sense signals to produce a controlled output. Specific applications for electronic controllers to which the preferred embodiments of the invention are addressed are aircraft electrohydraulic feel force generating systems and rudder ratio changer servo loops. Both of these systems relate to the safe operation of an aircraft and, as such, should be precise in operation. Further, a controller should include fault detection circuitry which accurately and quickly indicates the condition of a fault in the system. Moreover, the controller should include equalization cirucitry to eliminate fault indications which would otherwise be caused by system tolerances.

The prior art systems have not provided the above functions, particularly for the above-identified applications.

SUMMARY OF THE INVENTION

It is an object of this invention, therefore, to provide an improved electronic controller which is precise in operation and provides an accurate and fast indication of a fault condition.

It is a further object of the invention, to provide the above-described improved electronic controller having equalization circuitry to eliminate faults which would otherwise be caused by system tolerances.

Briefly, according to the invention, an electronic controller produces a controlled output in response to a pair of input signals. The controller includes a means which processes the input signals, passing the processed signals to the inputs of a pair of summers. The output from the summers couple to inputs of a pair of servo amplifiers. The servo amplifier outputs are utilized by an appropriate utilization means. Feedback circuitry senses the status of the utilization means and produces negative feedback signals which are coupled as inputs to the summer means such that for ideal operation of the electronic controller the output signals from the servo amplifiers are identical. A comparator compares the two servo amplifier output signals and produces a difference signal related to the difference therebetween. Threshold warning circuitry produces a warning indication in response to the difference signal at the comparator output exceeding a predetermined reference level, thereby detecting a fault condition.

In addition, equalizer circuitry processes the difference signal at the comparator output and applies a negative feedback correction signal to an input of each summer thereby reducing offsets between the servo amplifier outputs due to system tolerances.

DETAILED DESCRPTION OF THE PREFERRED EMBODIMENTS OF THE INVENTION

Figure 1:
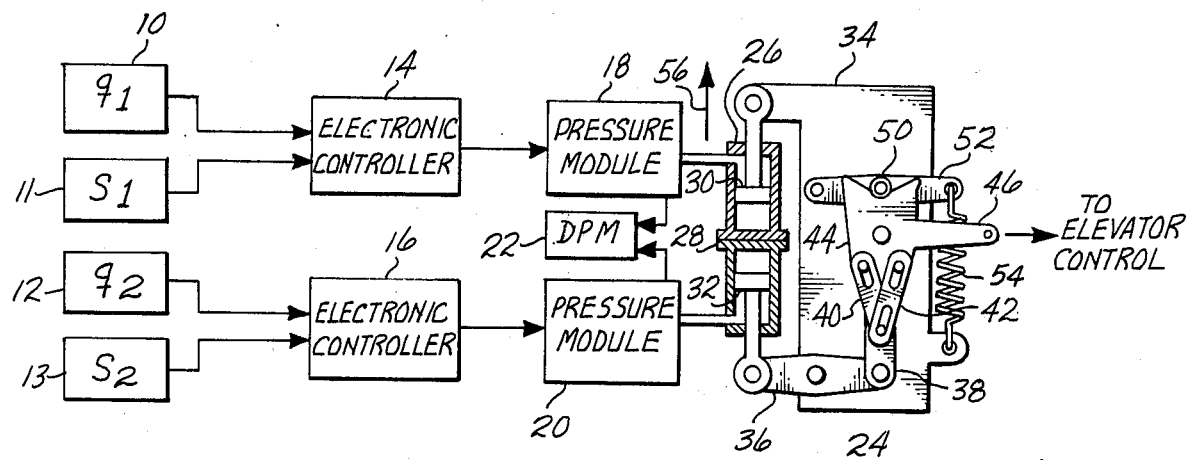
FIG. 1 is a block diagram of the preferred embodiment of the aircraft electrohydraulic feel force generating system according to the invention.

FIG. 1 illustrates the preferred embodiment of an aircraft electrohydraulic feel force generating system according to the invention. The purpose of such systems is to apply a force to the pilot's column representative of aircraft airspeed and stabilizer position. This gives the pilot a "feel" of the status of the aircraft and results in the pilot always having to apply a constant force on his column to achieve a given change in the aircraft.

Referring, then, to FIG. 1 sensors 10–13 monitor aircraft parameters. Sensors 10 and 12 are redundant impact pressure airspeed indicating signals, as are commonly supplied by pitot static sensors. These produce signals $q_1$, $q_2$ corresponding to aircraft airspeed. Sensors 11 and 13 are redundant stabilizer position sensors producing signals $s_1$ and $s_2$ corresponding to the aircraft's stabilizer position.

The signals $q_1$ and $s_1$ are fed to inputs of a first electronic controller 14. Correspondingly, the signals $q_2$ and $s_2$ are fed to inputs of a second electronic controller 16. While the preferred construction of the electronic controllers 14, 16 is shown in detail in FIG. 2, for purposes of FIG. 1 it should be understood that each electronic controller 14, 16 includes processing circuitry for producing output control signals corresponding to a desired feel pressure for the given input signals.

The output control signals from electronic controller 14 are routed to a pressure module 18 whereas the output signals from electronic controller 16 are passed to a pressure module 20. The pressure modules 18, 20 produce hydraulic pressures corresponding to the signals from the electronic controllers 14, 16. These pressures are applied to driving a feel actuator, as will be described hereinafter. A differential pressure monitor 22 monitors the pressure difference between pressure module 18 and pressure module 20 and produces a warning indication if the difference between the pressure levels exceeds a reference level.

The output from the pressure modules 18, 20 are routed to a standard feel and centering mechanism, indicated generally at 24. At the input of feel and centering mechanism 24, and receiving the hydraulic pressure from pressure modules 18, 20 is a feel actuator 26. Feel actuator 26 is comprised of a cylinder section 28 and a pair of pistons 30, 32. The rod from piston 30 pivotally connects to a base plate 34 whereas the rod from piston 32 pivotally connects to a pivot lever 36 which, in turn, connects to a tie bar 38. Tie bar 38 connects to tie straps 40, 42 which, via suitably provided slots, connect to pins provided on a centering cam plate 44. Extending from centering cam plate 44 is the output crank 46 which connects through a linkage (not shown) to the elevator control system, thereby providing a resistive force to the pilot's column. A roller 50 provided on a lever arm 52 rides in a V-slot provided in centering cam plate 44. One end of lever 52 is spring loaded to the base plate 34 via centering spring 54.

Thus, operation of the feel and centering mechanism 24 in accordance with input pressures from pressure modules 18 and 20 may be understood as follows. If, for example, the pressure from pressure module 18 exceeds that provided from pressure module 20, the cylinder 28 moves in the direction indicated by arrow 56 until the piston 32 bottoms on the cylinder surface. This results in the force acting on lever 36 being determined by the pressure from module 18.

Should the output pressure from module 20 exceed that provided from module 18, the cylinder 28 would be driven in a direction opposite that of arrow 56, resulting in the force on lever 36 being determined by the pressure from module 20. As such, the pilot would sense the higher of the two feel pressures on his column control.

Should both hydraulic systems fail, the centering spring 54 and roller 50 assure a minimum feel force backup to the system.

Figure 2:
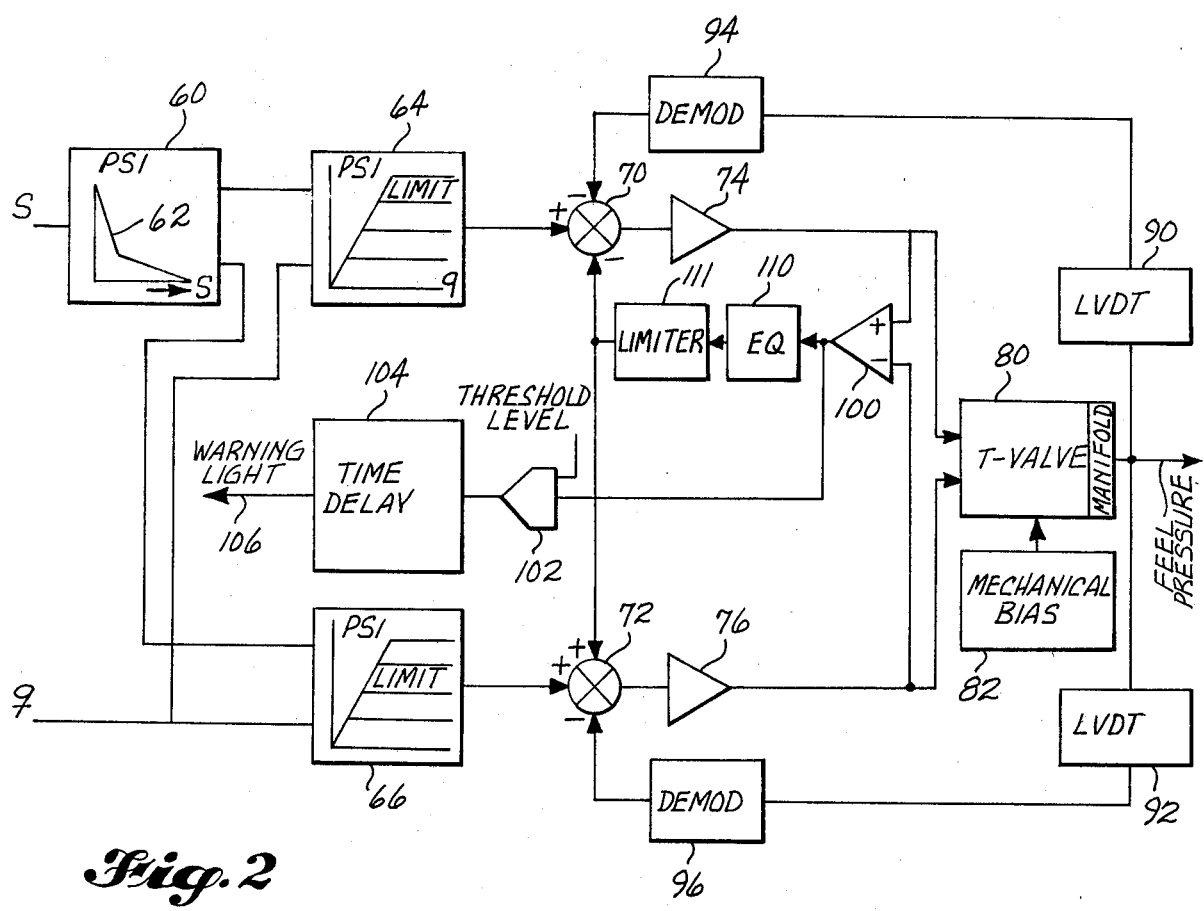
FIG. 2 is a block diagram detailing the preferred embodiment of the electronic controller as used in the system of FIG. 1.

FIG. 2 is a detailed schematic diagram showing the preferred construction of each of the electronic controllers 14, 16. Here, the stabilizer position signal s is passed to a feel pressure limit block 60. Given the stabilizer position signal s, block 60 determines a corresponding feel pressure limit, in pounds per square inch, in accordance with a predetermined function, here indicated as 62. The function 62, as is well known in this art, is determined for a given aircraft configuration.

The feel pressure limit signal from block 60 is routed to feel pressure command blocks 64, 66. Also passed to the feel pressure command blocks 64, 66 is the signal q, representative of aircraft airspeed. Blocks 64, 66 contain identical transfer functions, here indicated graphically, which produce an output feel pressure command signal corresponding to the signal q, and the signal s as processed through feel pressure limit block 60. As with the transfer function of block 60, the exact functional relationship between the input signals to block 64 and its feel pressure command output signal is related to a given aircraft configuration.

The feel pressure command signal from each of the feel pressure command blocks 64, 66 is passed to an input of a pair of summers 70, 72, respectively. Each summer 70, 72, in the conventional manner, produces an output signal equal to the sum and/or difference of signals applied to its inputs.

The output from each summer 70, 72 is passed to the input of servo amplifiers 74, 76, respectively. Amplifiers 74, 76, besides providing a predetermined gain to signals applied at their inputs, may include low pass circuitry to eliminate high frequency noise. Preferably, each servo amplifier 74, 76 is designed to saturate at a predetermined current level for reasons which will be discussed herein below. Thus, in one application of the invention, each servo amplifier 74, 76 was designed to saturate at ±8 milliamperes.

The output signals from the servo amplifiers 74, 76 are passed to a T-valve/manifold unit 80, which comprises each of the pressure modules 18, 20 of FIG. 1. The T-valve, which is a readily available electrohydraulic component, sums the currents from the servo amplifers 74, 76 and provides a predetermined hydraulic flow as a function thereof. This flow, as routed to the manifold portion of block 80, results in a corresponding feel pressure output. A mechanical bias, here indicated as provided from block 82 is coupled to the T-valve in unit 80. Per the example above wherein each servo amplifier 74, 76 is designed to saturate at ±8 milliamp current, the mechanical bias 82 requires a total of 8 milliamps of input current for the T-valve to be at null (no change in pressure). Thus, if one channel fails high (i.e. one channel produces 8 milliamps continuously regardless of its input) the system will servo back via its feedback as is discussed herein below resulting in a negative current supplied from the remaining operable servo amplifier thereby tending to correct for the fault. If this were not done, a fault of one servo amplifier causing it to go to its high 8 milliampere limit would result in a very high feel pressure at the pilot's column thereby requiring the pilot to exert considerable force to overcome column pressure. Thus, the mechanical bias 82 corrects for a failure in the system which would otherwise cause excessive feel forces.

The pressure produced from the T-valve/manifold unit 80 is monitored by a pair of pressure transducers 90, 92, each comprised of a bellow with a suitable spring rate and a linear variable differential transformer. The transformers 90, 92, operating in the well known manner, produce an AC signal corresponding to the pressure at the output of unit 80. These AC signals are suitably demodulated in a pair of demodulators 94, 96, thereby producing DC signals representative of output feel pressure. The outputs from demodulators 94, 96 are passed to summers 70, 72 respectively in a negative sense, thereby forming negative feedback loops around servo amplifiers 74, 76 respectively. As a result of this negative feedback, when the system is operating properly the signal levels from amplifier 74 and 76 should be approximately equal. However, if a fault arises in the system the outputs from the two servo amplifiers 74, 76 will likely vary. This variance is sensed by a comparator 100 which, in the normal manner, produces an output signal related to the difference between signals at its inputs. This difference signal is passed to a threshold level circuit 102. The threshold level circuit has a threshold reference level applied to its remaining input and, should the difference signal exceed this threshold reference an output signal from circuit 102 is generated. Should the output from threshold level circuit 102 indicate a fault condition for a minimum delay time, as determined by a time delay block 104 then a warning indication, as by a warning light, is produced on an output line 106. This warning indication would normally be supplied to the flight deck thereby indicating to the pilot that a fault has occurred in the feel force generating system.

The output from comparator 100 is also fed to an equalizing circuit 110. Equalizing circuit 110, which acts as a slow integrator, produces an output equalizing signal which is fed in a negative sense to summer circuit 70 and in a positive sense to summer circuit 72. The use of equalizer 110 permits a high loop gain to be used in servo amplifiers 74, 76, thus assuring a high degree of system precision, but prevents system component tolerances from tripping the warning system, comprised of threshold detector 102 and time delay 104. Since the equalizing signal is fed back into each servo loop in an opposite sense, the resulting feel pressure is the average of the two commands. The equalizing signal is limited, in limiter 111, so as to prevent a slow failure of one servo loop to a high or low pressure command from being undetected by the monitor.

Thus the electronic controller as shown in FIG. 2 provides a precise and fast method for determining that a fault has occurred in the system and further provides an equalizer which compensates for system tolerances to eliminate nuisance fault detections which would otherwise occur.

Figure 3:
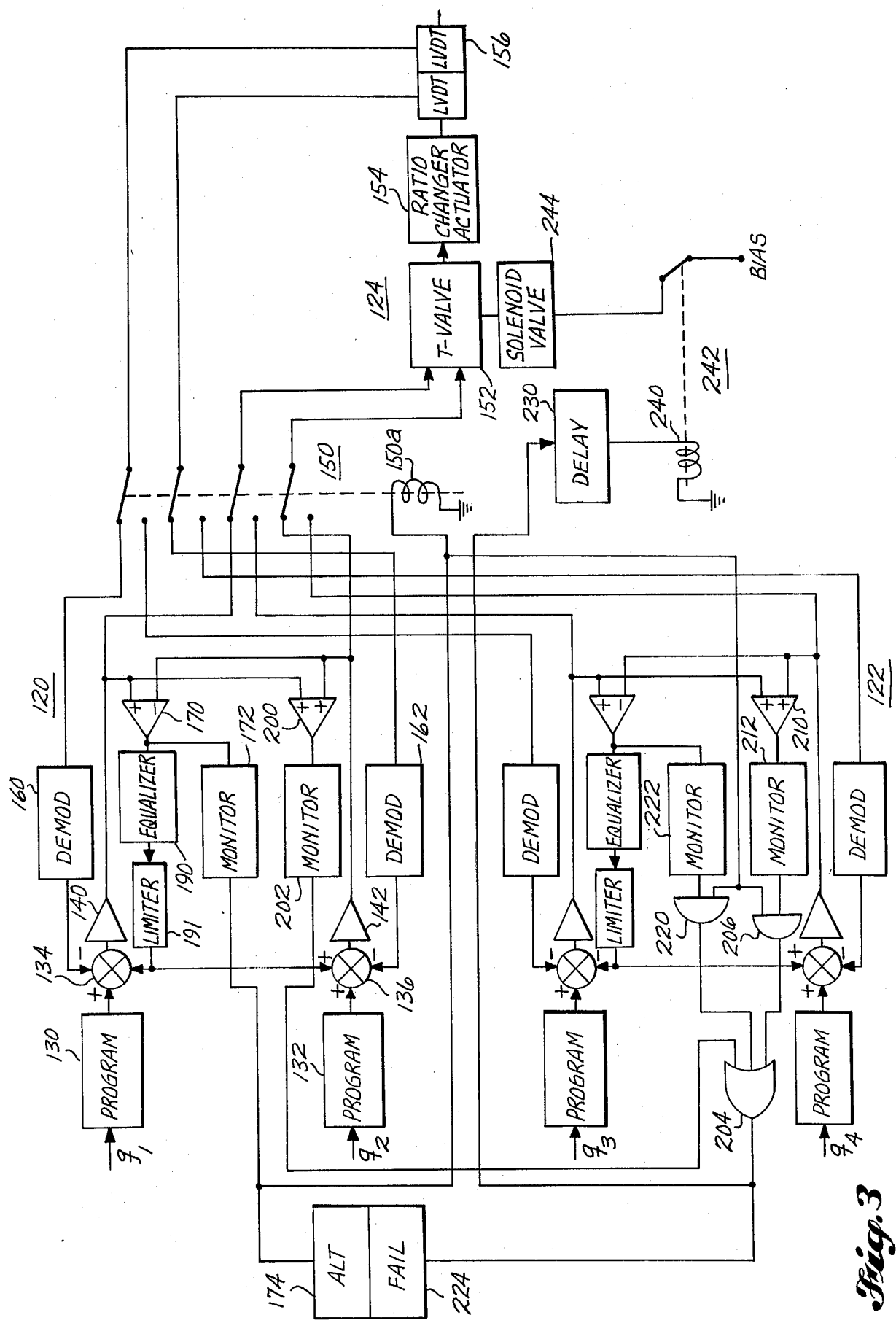
FIG. 3 is a detailed diagram of the preferred embodiment of the aircraft rudder ratio changer according to the invention.

FIG. 3 is a detailed schematic diagram illustrating the preferred embodiment of an aircraft rudder ratio changer system. This system is comprised of two identical electronic channels 120, 122 and one electrohydraulic servo 124. Inputs to the system include four aircraft airspeed sense signals $q_1$–$q_4$, as may be supplied by conventional airspeed sensors or may be computed airspeed values. The airspeed signals $q_1$, $q_2$ are applied to the first electronic channel 120, whereas the signals $q_3$ and $q_4$ are applied to the second electronic channel 122. Thus, this preferred embodiment of the invention employs a quadruple redundant airspeed sense system.

As will be seen in the discussion hereinbelow, the electronic channel 120 is the primary channel whereas channel 122 is a standby channel. Thus, the topology of the second electronic channel 122 is very similar to the first 120 and, as such, only the differences therebetween will be discussed.

The input airspeed sense signals $q_1$, $q_2$ are applied to input program blocks 130, 132, respectively. The program blocks 130, 132 produce an output actuator position signal which is a predetermined function of the input airspeed sense signal. This functional relationship, as will be understood by anyone of ordinary skill in this art, is designer selected based upon the desired operation of the system.

The actuator position command signals from the outputs of program blocks 130, 132 are passed to inputs of respective summers 134, 136. The outputs from the summers are coupled to corresponding servo amplifiers 140, 142. The outputs from servo amplifiers 140, 142 are passed through a relay, indicated generally at 150 which, as shown, is in a position to select the outputs from electronic channel 120. Thus, the outputs of servo amplifiers 140, 142 are applied as inputs to a T-valve 152. T-valve 152, acting in the conventional manner, controls hydraulic flow at its output in response to the sum of the electrical signals applied at its inputs. Thus, the output from T-valve 152 controls the rudder ratio changer actuator 154.

Two linear variable differential transducers 156 sense the position of the actuator and, in response thereto, produces AC feedback signals which are routed through the relay 150 to demodulators 160, 162. The demodulators 160, 162 produce output DC control signals corresponding to the AC input signals. These DC control signals are applied to the summers 134, 136 in a negative sense, thus realizing negative feedback loops around amplifiers 140, 142, respectively.

Hence, the feedback loops around the servo amplifiers 140, 142 tend to cause the outputs thereof to be approximately equal for normal system operation.

Should a failure associated with one of the servo amplifiers 140, 142 occur, this is sensed by a comparator 170 which constantly monitors the difference between the outputs of amplifiers 140, 142. Should the difference exceed a reference level, as determined by monitor 172, a fault condition is detected and the monitor causes an alternate channel indicating lamp "ALT" 174 to light in the cockpit indicating the detected failure. Also, monitor 172 produces a current through the coil 150a of relay 150 thereby activating all of the contacts of relay 150 to their alternate state thereby switching control from electronic channel 120 to electronic channel 122. Electronic channel 122 will continue to run the system in response to its input signals $q_3$ and $q_4$ in a manner identical to that of electronic channel 120.

Since it is desirable to operate the servo amplifiers 140, 142 with high open loop gain to thereby assure precise system operation, it would be possible for system tolerances in the electronic channel to produce a false fault detection. To overcome this probblem, an equalizer 190 is employed. Equalizer 190 is a slow integrator which senses the servo amplifier difference signal as produced by comparator 170 and provides an equalization signal at its output which is passed in a positive sense to summer 136 and in a negative sense to summer 134. Thus, the net effect on T-valve 152 is an average of the two equalizer commands, and the two servo amplifiers 140, 142 will, for normal operation, have equal outputs. Equalizing the two servo amplifiers prevents normal system tolerances from tripping the monitor.

The equalizing signal is passed through a limiter, 191, to prevent a slow failure of one servo loop to a low or high position command from being undetected by the monitor 120.

The system also includes a safety mode should either the T-valve 152 or actuator 154 fail. In such an event, the servo amplifiers in the electronic channel 120 or 122, whichever is controlling the system, would both saturate to their limits in the same direction. Thus, discussing this condition with respect to electronic channel 120, an amplifier 200 sums the two servo amplifier output signals and passes these to a monitor 202. Should the monitor detect that the sum of the two servo amplifier outputs exceed a reference threshold, it produces an output indication which is applied as one input to an OR gate 204. There is a similar amplifier 210 and monitor 212 in the second electronic channel 122. The output of monitor 212 goes to AND gate 206 which also receives an input from monitor 172. The output of AND gate 206, which is passed to OR gate 204, indicates a failure of channel 122 when this channel is in control. The final input to OR gate 204 is from the output of AND gate 220. The inputs to AND gate 220 are the output from monitor 202 and the output from the identical monitor 222 of the second electronic channel 122. Thus, if both monitors 202 and 222 indicate that their respective channels have failed AND gate 220 is satisfied and produces an output to OR gate 204.

If any of the inputs to OR gate 204 is activated, indicative of a total system failure, OR gate 204 both lights a failure light 224 in the cockpit, thereby notifying the flight crew of the failure and produces a signal which is coupled to delay block 230. Delay block 230 only produces an output if its input level is activated for a sufficient period of time. This thereby eliminates transient type system failure indications. When delay block 230 receives an input signal for a sufficient period of time, it produces an output signal which is coupled through the coil 240 of a relay 242. With the relay activated, bias is removed from a solenoid valve 244 which shuts off hydraulic pressure to the T-valve 124. A bias spring (not shown) drives the actuator to the full rudder authority position.

Thus, in operation, the disclosed rudder ratio changer system provides a fast and accurate means for switching from a faulty main channel to a standby channel and, in the event of total system failure, for indicating such failure and deactivating the system from ratio changer control.

While preferred embodiments of the invention have been described in detail, it should be apparent that many modifififcations and variations thereto are possible, all of which fall within the true scope and spirit of the invention.

I claim:

1. An electronic controller for producing a controlled output in response to a pair of input signals comprising:
   means for processing said input signals;
   a pair of summer means, each summer having a plurality of inputs and an output and producing an output signal equal to the summation of the signals coupled to its inputs;
   means for coupling each of said processed input signals to an input of one of said summers;
   a pair of servo amplifier means;
   means for coupling each summer means output to one of the servo amplifier inputs;
   utilization means including an actuator, said actuator responding to each output from said pair of servo amplifier means;
   feedback means for sensing the status of said utilization means and producing negative feedback signals to an input of each summer means such that for ideal operation of the electronic controller the output signals from said pair of servo amplifiers are identical;
   comparator means for comparing the two servo amplifier output signals and producing a difference signal related to the difference therebetween;
   threshold warning means for producing a warning indication in response to said difference signal exceeding a predetermined reference threshold; and
   equalizer circuitry means for processing said difference signal and applying a negative feedback correction signal to an input of each summer means thereby reducing offsets between the servo amplifier outputs due to system tolerance.

2. An electronic controller for producing a controlled output in response to a pair of input signals comprising:
   means for processing said input signals;
   a pair of summer means, each summer having a plurality of inputs and an output and producing an output signal equal to the summation of the signals coupled to its inputs;
   means for coupling each of said processed input signals to an input of one of said pair of summers;
   a pair of servo amplifier means;
   means for coupling each summer means output to one of the servo amplifiers inputs;
   utilization means including an actuator, said actuator responding to each output from said pair of servo amplified means;
   feedback means for sensing the status of said utilization means and producing negative feedback signals to an input of each summer means such that for ideal operation of the electronic controller the output signals from said servo amplifiers are identical;
   comparator means for comparing the two servo amplifier output signals and producing a difference signal related to the difference therebetween; and
   equalizer circuitry means for processing said difference signal and applying a negative feedback correction signal to an input of each summer means thereby reducing offsets between the servo amplifier outputs due to system tolerances.

3. The electronic controller of claim 2 further comprising:
   threshold warning means for producing a warning indication in response to said difference signal exceeding a predetermined reference threshold.

4. The electronic controller of either of claims 1 or 2 wherein said utilization means is comprised of an electrohydraulic means, said electrohydraulic means producing a hydraulic pressure related to the signals from said servo amplifiers.

5. An aircraft electrohydraulic feel force generating system comprising:
   a pair of electronic controllers, each controller including:
     first and second processing means, each one of which is adapted to received signals representative of both aircraft stabilizer position and airspeed and produce a feel pressure command signal as a predetermined function thereof;
     a pair of summer means, each summer having a plurality of inputs and an output, and producing an output signal equal to the summation of the signals coupled to its inputs;
     means for coupling each feel pressure command signal to the input of one of the summer means;
     a pair of servo amplifier means;
     means for coupling each summer means output to one of the servo amplifier inputs;
     an electrohydraulic T-valve/manifold unit for producing a hydraulic pressure related to the output signals from the servo amplifiers;
     feedback means for sensing said hydraulic pressure and producing negative feedback signals to an input of each summer means such that for ideal operation of the electronic controller the output signals from the pair of servo amplifiers are identical;
     comparator means for comparing the two servo amplifier output signals and producing a difference signal related to the difference therebetween;
     threshold warning means for producing a warning indication in response to said difference signal exceeding a predetermined reference threshold;
   a feel and centering mechanism including a feel actuator and mechanical linkage for providing a pilot with column feel force;
   a pair of pressure modules, each module coupling an electronic controller output to said feel actuator; and
   equalizer circuitry means for processing said difference signal and applying a negative feedback correction signal to an input of each summer means thereby reducing offsets between the servo amplifier outputs due to system tolerances.

6. An aircraft electrohydraulic feel force generating system comprising:
   a pair of electronic controllers, each controller including:
     first and second processing means, each one of which being adapted to input signals respresentative of both aircraft stabilizer position and airspeed and produce a feel pressure command signal as a predetermined function thereof;
     a pair of summer means, each summer having a plurality of inputs and an output, and producing an output signal equal to the summation of the signals coupled to its inputs;
     means for coupling each feel pressure command signal to the input of one of the summer means;
     a pair of servo amplifier means;
     means for coupling each summer means output to one of the servo amplifier inputs;
     an electrohydraulic T-valve/manifold unit for producing a hydraulic pressure related to the output signals from the servo amplifiers;

feedback means for sensing the said produced hydraulic pressure and producing negative feedback signals to an input of each summer means such that for ideal operation of the electronic controller the output signals from the servo amplifiers are identical;

comparator means for comparing the two servo amplifier output signals and producing a difference signal related to the difference therebetween; and equalizer circuitry means for processing said difference signal and applying a negative feedback correction signal to an input of each summer means thereby reducing offsets between the servo amplifier outputs due to system tolerances.

7. The system of claim 6 further comprising:
threshold warning means for producing a warning indication in response to said difference signal exceeding a predetermined reference threshold.

8. The system of any one of claims 5 through 7 wherein the T-valve includes a mechanical bias offset for reducing the effect of a failure to a high feel pressure mode in one of the servo amplifier signal paths.

9. An aircraft rudder ratio servo loop system comprising:
an electronic controller including:
first and second processing means, each processing means receiving a signal representative of airspeed and producing a command signal in response thereto;
a pair of summer means, each summer having a plurality of inputs and an output and producing an output signal equal to the summation of the signals coupled to its inputs;
means for coupling each command signal to the input of one of the summer means;
a pair of servo amplifier means;
means for coupling each summer means output to one of the servo amplifier inputs;
feedback means adapted for sensing the status of a ratio changer actuator and producing negative signals to an input of each summer means such that for ideal operation of the electronic controller the output signals from the servo amplifiers are identical;
comparator means for comparing the two servo amplifier output signals and producing a difference signal related to the difference therebetween;
threshold warning means for producing a warning indication in response to said difference signal exceeding a predetermined reference threshold; and
equalizer circuitry means for processing said difference signal and applying a negative feedback correction signal to an input of each summer means thereby reducing offsets between the servo amplifier outputs due to system tolerances;
the aircraft rudder ratio servo loop system further comprising:
an electrohydraulic means for producing a hydraulic pressure related to the output signals from the servo amplifiers;
ratio changer actuator means responsive to said produced hydraulic pressure.

10. The system of claim 9 further comprising:
a second controller being identical to said first electronic controller; and
switching means responsive to the production of a warning indication of said first electronic controller to disconnect the same from controlling said ratio changer actuator and connecting said second electronic controller in the place thereof.

11. The system of claim 10 wherein the switching means further comprises:
means for responding to warning indications from both the first and second electronic controllers to disable said controllers from controlling said ratio changer actuator.

* * * * *